US010381910B2

(12) United States Patent
Shim et al.

(10) Patent No.: US 10,381,910 B2
(45) Date of Patent: Aug. 13, 2019

(54) LINEAR VIBRATION GENERATING DEVICE

(71) Applicant: JAHWA electronics Co., Ltd., Chungcheongbuk-do (KR)

(72) Inventors: Soon Koo Shim, Chungcheongbuk-do (KR); Young Bin Chong, Chungcheongbuk-do (KR); Chun Choi, Chungcheongbuk-do (KR); Won Gook Lee, Chungcheongbuk-do (KR); Min Goo Lee, Chungcheongbuk-do (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 62 days.

(21) Appl. No.: 15/580,999

(22) PCT Filed: Nov. 25, 2015

(86) PCT No.: PCT/KR2015/012710
§ 371 (c)(1),
(2) Date: Dec. 8, 2017

(87) PCT Pub. No.: WO2017/007085
PCT Pub. Date: Jan. 12, 2017

(65) Prior Publication Data
US 2018/0166960 A1   Jun. 14, 2018

(30) Foreign Application Priority Data

Jul. 6, 2015  (KR) .......................... 10-2015-0096081

(51) Int. Cl.
H02K 33/00 (2006.01)
H02K 35/00 (2006.01)
H02K 33/02 (2006.01)

(52) U.S. Cl.
CPC .................................... *H02K 33/02* (2013.01)

(58) Field of Classification Search
CPC ....................................................... H02K 33/02
(Continued)

(56) References Cited

U.S. PATENT DOCUMENTS

2001/0017491 A1* 8/2001 Ruberl ..................... B06B 1/045
310/36
2010/0277009 A1* 11/2010 Jeon ........................ H02K 33/18
310/25
(Continued)

FOREIGN PATENT DOCUMENTS

JP    2001352739 A    12/2001
JP    2003319632 A    11/2003
(Continued)

OTHER PUBLICATIONS

International Search Report dated May 4, 2016 from corresponding International Application No. PCT/KR2015/012710 (5 pages).
(Continued)

*Primary Examiner* — Yuriy Semenenko
(74) *Attorney, Agent, or Firm* — Maier & Maier, PLLC

(57) ABSTRACT

A linear vibration generating device, which includes a stator fixed on a bracket and having a center yoke concentrically fixed in an inner space of coil winding units and at least one blade extending from the center yoke in a direction perpendicular to the concentric axis, and a vibrator having a magnet surrounding outer circumferences of the coil winding units, and an elastic body disposed between the stator and the vibrator. The blade has at least one passage through which a coil wire for electrically connecting the coil winding units passes.

11 Claims, 8 Drawing Sheets

(58) Field of Classification Search
USPC .......................................................... 310/25
See application file for complete search history.

(56) References Cited

U.S. PATENT DOCUMENTS

| | | | | |
|---|---|---|---|---|
| 2011/0133577 A1* | 6/2011 | Lee | ........................ | H02K 33/18 310/15 |
| 2011/0198949 A1* | 8/2011 | Furuich | .................. | H02K 33/16 310/25 |
| 2013/0049491 A1* | 2/2013 | Kim | ........................ | H02K 33/16 310/25 |
| 2014/0001889 A1* | 1/2014 | Hong | ..................... | H02K 33/18 310/25 |
| 2015/0214822 A1* | 7/2015 | Kim | ....................... | H02K 33/18 310/25 |

FOREIGN PATENT DOCUMENTS

| | | | |
|---|---|---|---|
| JP | 2004135369 A | | 4/2004 |
| JP | 2011189337 A | | 9/2011 |
| KR | 10-20090048677 A | | 5/2009 |
| KR | 20140040897 A | * | 4/2014 |

OTHER PUBLICATIONS

PCT Written Opinion dated May 4, 2016 from corresponding International Application No. PCT/KR2015/012710 (6 pages).

* cited by examiner

LINEAR VIBRATION GENERATING DEVICE

FIELD

Various embodiments of the present disclosure relate to a linear vibration generating device used for a portable electronic equipment.

BACKGROUND

Generally, a linear vibration generating device used as a silent receiver of portable electronic equipment gives fast vibrations due to a short travel distance of a moving part and the elasticity of an elastic body, compared with an existing eccentric rotation-type vibration motor.

The linear vibration generating device is an element that converts electric energy into mechanical vibration by using the electromagnetic force generating principle.

In other words, the linear vibration generating device is generally composed of a vibrator having a magnet and a stator supporting the vibrator, and generates vibration by moving the vibrator up and down by means of mutual interactions between an electromagnetic force generated by applying a current to a coil and a magnetic force generated by the magnet.

That is to say, the linear vibration generating device does not use the motor rotating principle but uses a vibrating principle in which an electromagnetic force obtained by an elastic body installed therein and a weight suspended from the elastic body is periodically generated to conform to the resonance frequency to create the resonance.

However, the conventional linear vibration generating device as above has a following problem.

When the conventional linear vibration generating device is operating, one coil and one magnet are disposed to face each other and interact with each other to generate vibrations, which however is able to give a weak vibrating force.

SUMMARY

The present disclosure is directed to providing a linear vibration generating device, which may have an improved vibrating force by disposing coil winding units at upper and lower portions of a center yoke and providing a blade to face the coil winding units simultaneously.

The present disclosure is directed to providing a linear vibration generating device, which may generate an electromagnetic force in an improved way by means of interactions of the coil winding unit and the magnet by forming a passage in the blade so that coil wires of the coil winding units disposed at the center yoke may pass therethrough, thereby allowing a current to be easily applied to the coil winding units.

In one aspect of the present disclosure, there is provided a linear vibration generating device, comprising: a stator fixed on a bracket and having a center yoke concentrically fixed in an inner space of coil winding units and at least one blade extending from the center yoke in a direction perpendicular to the concentric axis; a vibrator having a magnet surrounding outer circumferences of the coil winding units; and an elastic body disposed between the stator and the vibrator, wherein the blade has at least one passage through which a coil wire for electrically connecting the coil winding units passes.

According to various embodiments of the present disclosure, a vibrating force may be improved by disposing coil winding units at upper and lower portions of a center yoke and providing a blade to face the coil winding units simultaneously. Also, an electromagnetic force may be generated in an improved way by means of interactions of the coil winding unit and the magnet by forming a passage in the blade so that coil wires of the coil winding units disposed at the center yoke may pass therethrough, thereby allowing a current to be easily applied to the coil winding units.

DETAILED DESCRIPTION

Figure 1:
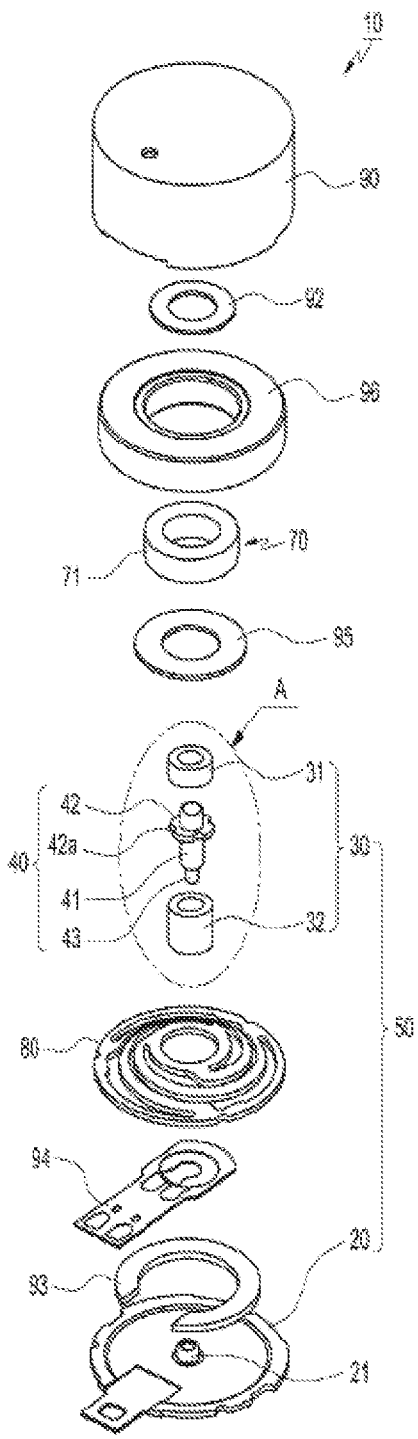
FIG. 1 is an exploded perspective view showing a linear vibration generating device according to various embodiments of the present disclosure.

A best mode of the present disclosure is directed to a linear vibration generating device, which includes a stator fixed on a bracket and having a center yoke concentrically fixed in an inner space of coil winding units and at least one blade extending from the center yoke in a direction perpendicular to the concentric axis; a vibrator having a magnet surrounding outer circumferences of the coil winding units; and an elastic body disposed between the stator and the vibrator, wherein the blade has at least one passage through which a coil wire for electrically connecting the coil winding units passes.

Electronic equipment (not shown) having a linear vibration generating device according to various embodiments of the present disclosure will be described. First, the electronic equipment according to the embodiment of the present disclosure may include all kinds of mobile communication terminals operating based on communication protocols corresponding to various communication systems, as well as all kinds of information communication devices, multimedia devices and application devices therefor such as a video telephone, an e-book reader, a laptop personal computer, a netbook computer, a personal digital assistant (PDA), a portable multimedia player (PMP), an MPEG-1 audio layer-3 (MP3) player, a mobile medical device, a camera or a wearable device (for example, a head-mounted device (HMD), an electronic apparel, an electronic bracelet, an electronic necklace, an electronic accessory, an electronic tattoo, or a smart watch).

According to some embodiments, the electronic equipment (not shown) having a linear vibration generating device may be a smart home appliance. The smart home appliance may include at least one of, for example, a television, a digital video disk (DVD) player, an audio, a refrigerator, an air conditioner, a cleaner, an oven, a microwave, a washing machine, an air cleaner, a set-top box, a TV box (for example, Samsung HomeSync™, Apple TV™, or Google TV™), a game console, an electronic dictionary, an electronic key, a camcorder, and an electronic photo frame.

According to some embodiments, the electronic equipment (not shown) having a linear vibration generating device may include at least one of various medical devices (for example, magnetic resonance angiography (MRA), magnetic resonance imaging (MRI), computed tomography (CT), tomograph, ultrasonic devices, or the like), a navigation device, a global positioning system (GPS) receiver, an event data recorder (EDR), a flight data recorder (FDR), an automotive infotainment device, a marine electronic device (for example, a marine navigation device, a gyro compass or the like), avionics, a security device, a car head unit, an industrial or home robot, an automatic teller's machines (ATM), and a point of sale (POS) at a shop.

According to some embodiments, the electronic equipment (not shown) may include at least one of a part of furniture or building/structure having a communication function, an electronic board, an electronic signature receiving device, a projector, and various measuring instruments (for example, water, electricity, gas or radio wave measuring instruments, or the like).

According to various embodiments of the present disclosure, the electronic equipment (not shown) may be one of various devices described above or a combination thereof. In addition, the electronic equipment according to various embodiments of the present disclosure may be a flexible device. Moreover, it is be apparent to those skilled in the art that the electronic equipment according to various embodiments of the present disclosure is not limited to the devices described above.

For example, the electronic equipment may be a smart phone or a wearable device. A touch screen may be disposed at a front center of the electronic equipment, and the touch screen may occupy most of the front surface of the electronic equipment. Thus, a linear vibration generating device is used to generate vibration when the touch screen is touched.

In other words, the linear vibration generating device is a component that converts electrical energy into mechanical vibration by using the electromagnetic force generating principle, and the linear vibration generating device is mounted to portable electronic equipment and is used for silently notifying any input or generating vibration when the touch screen is touched.

The linear vibration generating device applied to the electronic equipment according to various embodiments of the present disclosure may be provided with a smaller and slimmer design according to the trend of market demanding a smaller and slimmer design of portable electronic equipment, and also the linear vibration generating device may be produced efficiently.

Figure 2:
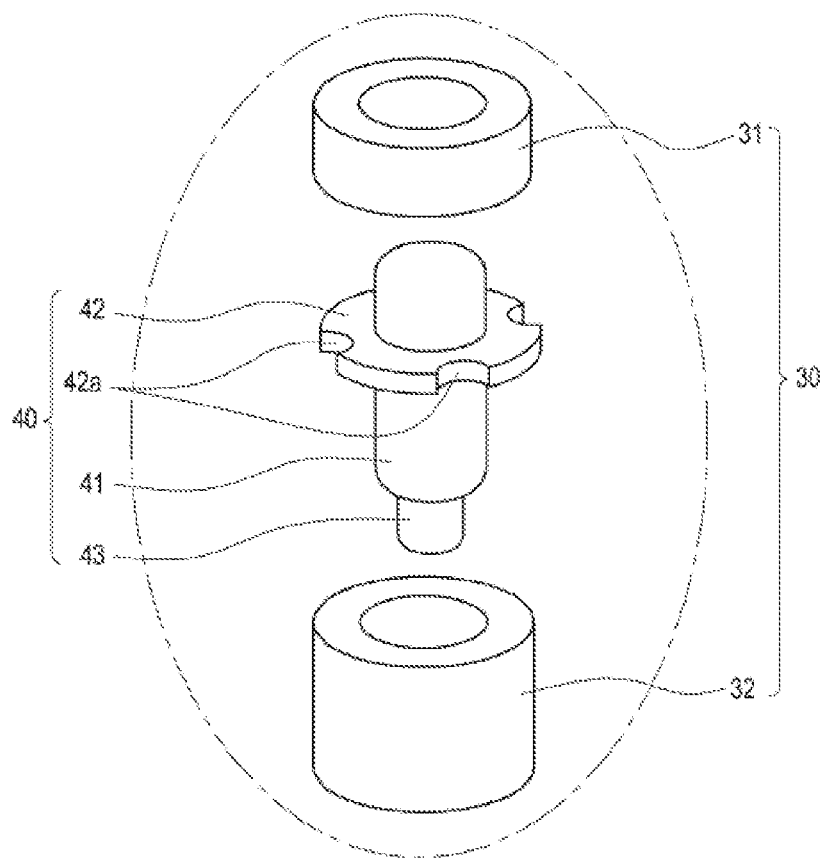
FIG. 2 is an enlarged exploded perspective view showing a portion A of FIG. 1.
Figure 3:
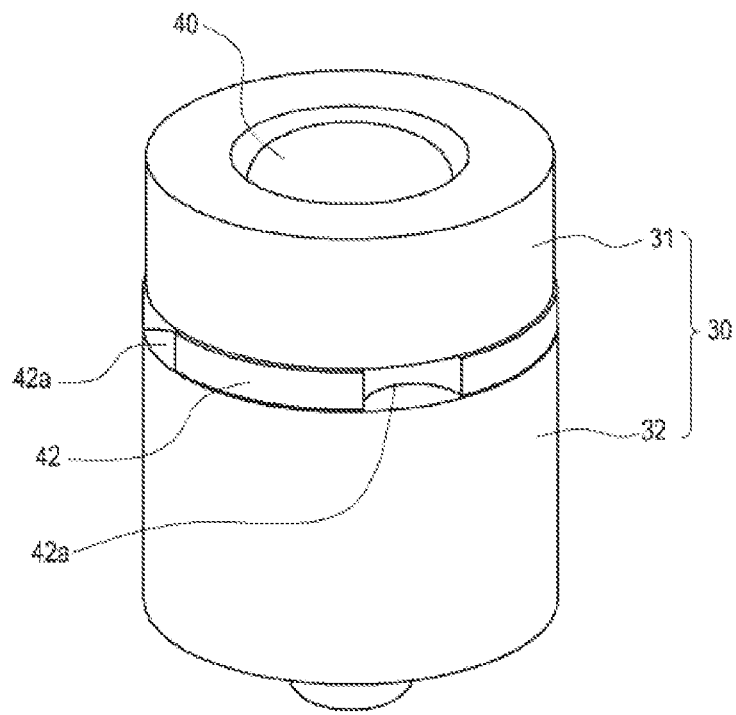
FIG. 3 is a perspective view showing a center yoke and coil winding units of the linear vibration generating device according to various embodiments of the present disclosure, in an assembled state.

FIG. 1 is an exploded perspective view showing a linear vibration generating device 10 according to various embodiments of the present disclosure, FIG. 2 is an enlarged exploded perspective view showing a portion A of FIG. 1, and FIG. 3 is a perspective view showing a center yoke 40 and coil winding units 30 of the linear vibration generating device 10 according to various embodiments of the present disclosure, in an assembled state.

Referring to FIGS. 1 to 3, the configuration of the linear vibration generating device 10 will be described. The linear vibration generating device 10 may include a stator 50 having a bracket 20, at least one coil winding unit 30 and center yoke 40, a vibrator 70 having a magnet 71, and an elastic body 80.

The center yoke 40 includes a body 41 and an at least one blade 42, and the blades 42 may be provided to extend in an outer direction of the body 41 so that the coil winding units 30 may be disposed thereon to face the blades 42.

For example, the blades are formed integrally with the center yoke, and a passage extends from a body of the center yoke. The coil winding unit 30 is composed of first and second coil winding units 31, 32, where the first coil winding unit 31 may be disposed at one surface of the blade 42 and the second coil winding unit 32 may be disposed at the other surface of the blade 42.

The first and second coil winding units 31, 32 are disposed at upper and lower sides of the blades 42 and simultaneously face the blades 42.

The first and second coil winding units 31, 32 may be wound in opposite directions.

Figure 6A:
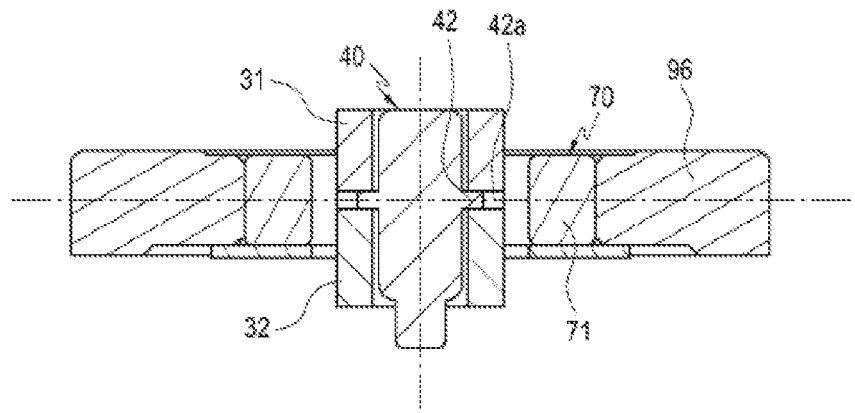
FIG. 6a is a longitudinal sectional view showing an arrangement of first and second coil winding units of the linear vibration generating device according to various embodiments of the present disclosure.

The first and second coil winding units 31, 32 may have winding numbers or heights symmetrically or asymmetrically. More specifically, as shown in FIG. 6a, if the center of the linear vibration generating device and the center of the vibrator (or, the magnet) are located at the same position or at adjacent positions, the first and second coil winding units 31, 32 may have winding numbers or heights symmetric to each other. In other words, when the linear vibration generating device 10 is in a stop state, if the magnet 71 is positioned at the center portion of the vibrator 70, the winding numbers and heights of the first and second coil winding units 31, 32 are identical or similar to each other.

Figure 6B:
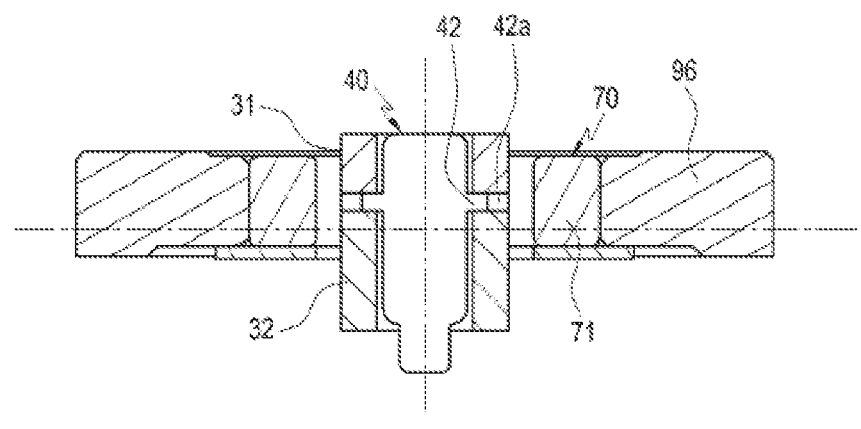
FIG. 6b is a longitudinal sectional view showing another arrangement of the first and second coil winding units of the linear vibration generating device according to various embodiments of the present disclosure.
Figure 6C:
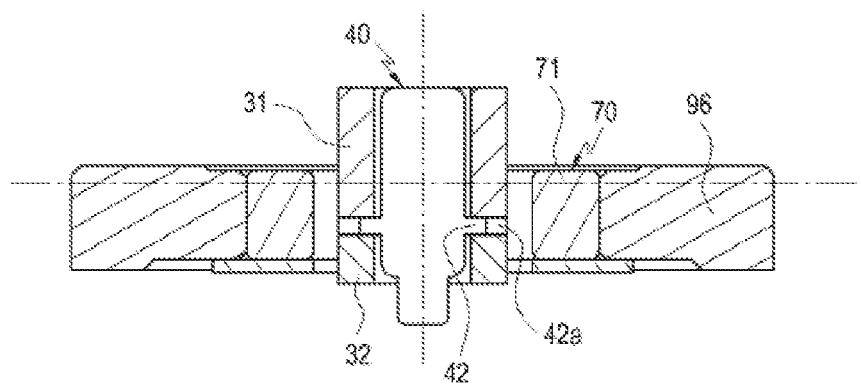
FIG. 6c is a longitudinal sectional view showing still another arrangement of first and second coil winding units of the linear vibration generating device according to various embodiments of the present disclosure.

If the center of the linear vibration generating device and the center of the vibrator (or, the magnet) are dislocated as shown in FIGS. 6b and 6c, the first and second coil winding units 31, 32 may have winding numbers or heights asymmetric from each other.

That is, if the magnet 71 is positioned above the center of the vibrator 70 when the linear vibration generating device 10 is in a stop state as shown in FIG. 6b, the winding number or height of the first coil winding unit 31 is greater than that of the second coil winding unit 32.

On the contrary, if the magnet 71 is positioned below the center of the vibrator 70 when the linear vibration generating device 10 is in a stop state as shown in FIG. 6c, the winding number or height of the second coil winding unit 32 is greater than that of the first coil winding unit 31.

In other words, in the present disclosure, as shown in FIGS. 6a and 6c, it is possible to make a slim design and maximize a vibrating force by adjusting the winding number or height of the winding unit according to a starting position of the vibrator.

Figure 4A:
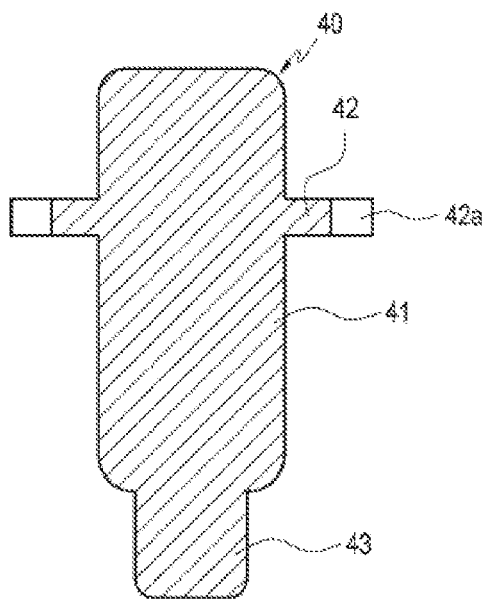
FIG. 4a is a longitudinal sectional view showing the center yoke of the linear vibration generating device according to various embodiments of the present disclosure.
Figure 4B:
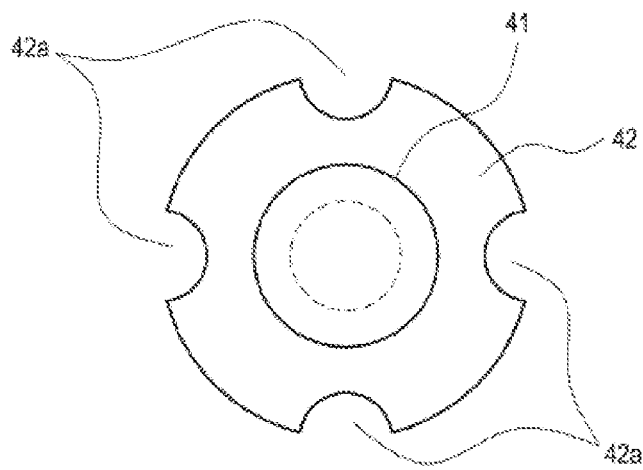
FIG. 4b is a plane view showing the center yoke of the linear vibration generating device according to various embodiments of the present disclosure.

In addition, seeing the blade in more detail, as shown in FIGS. 4a and 4b, at least one passage 42a is formed in the blade 42 so that a coil wire (not shown) for electrically connecting the coil winding units 30 may pass therethrough. The passage 42a may be formed with a passing groove. In other words, the passing groove allows the coil wire (not shown) of the coil winding units 30 to pass therethrough, and the coil wire (not shown) may be electrically connected to a substrate 94 through the passing groove in order to apply a current to the first and second coil winding units 31, 32. The passing groove may be formed to extend to the body of the center yoke or to be spaced from the body. In addition, in order to minimize movements other than vibrations of the vibrator 70 during the vibrating process, the passing grooves may be formed to be symmetric to each other.

The body 41 may be a cylindrical body 41 so as to be inserted into and disposed within the coil winding units 30. The body 41 may have other shapes, different from the cylindrical body 41. For example, the body 41 may be a rectangular body 41 or a triangular body 41. However, the body is preferably shaped to correspond to an inner circumferential shape of the section of the magnet 71 surrounding the body.

The elastic body 80 may be disposed between the bracket 20 and the magnet 71 to surround the outside of the coil winding units 30. In other words, one end of the elastic body 80 is provided at a lower portion of the vibrator 70, and the other end of the elastic body 80 is provided at the bracket 20, thereby supporting the vibration of the vibrator 70.

As described above, the blade 42 is integrally formed at the body 41 of the center yoke 40, the first and second coil winding units 31, 32 are disposed at the upper and lower portions of the blade 42, and the passage 42a for allowing the coil wire (not shown) of the coil winding units 30 to pass therethrough is formed. By doing so, a current may be easily applied to the coil winding unit 30, and thus it is possible to greatly generate an electromagnetic force according to the interaction between the coil winding unit 30 and the magnet 71, thereby generating a vibrating force sufficiently at the product.

In other words, as shown in FIG. 4a, the blade 42 may be formed to protrude at the center of the body 41. One surface of the blade 42 faces one side of the first coil winding unit 31, and the other surface of the blade 42 faces one side of the second coil winding unit 32. The blade 42 may extend from the body 41 or be spaced from the body 41.

Figure 7:
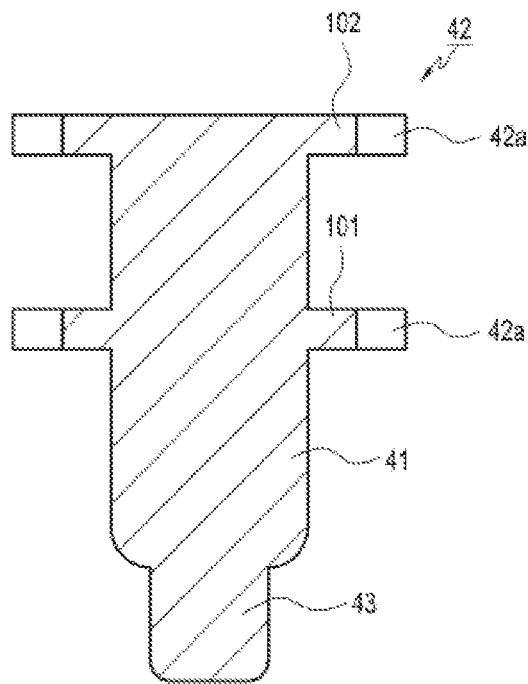
FIG. 7 is a longitudinal sectional view showing a center yoke of the linear vibration generating device according to another embodiment of the present disclosure.
Figure 8:
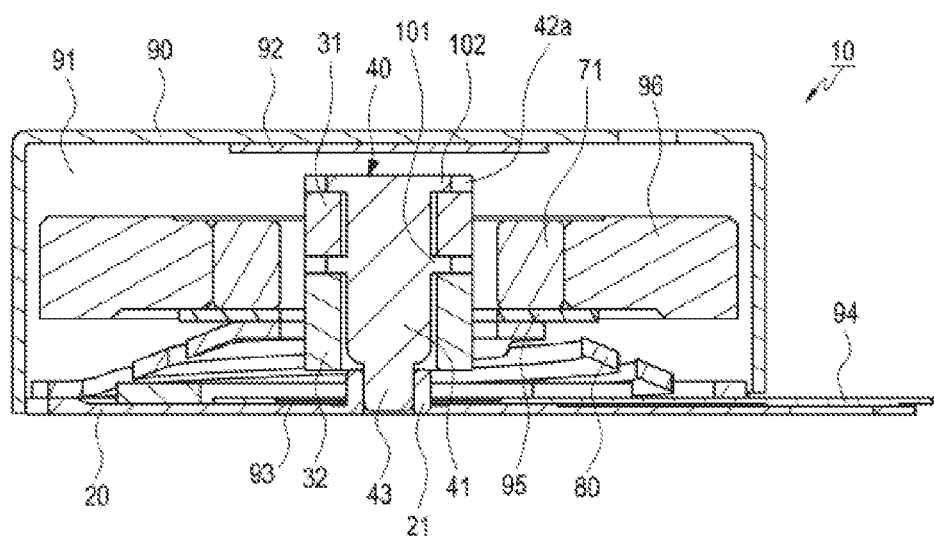
FIG. 8 is a longitudinal sectional view showing the linear vibration generating device according to various embodiments of the present disclosure in an assembled state, to which the center yoke of FIG. 7 is applied.

In addition, FIG. 7 is a longitudinal sectional view showing a blade 42 according to another embodiment of the present disclosure, and FIG. 8 is a longitudinal sectional view showing that the blade 42 of FIG. 7 is in use.

First, as shown in FIG. 7, the blade 42 is composed of first and second blades 101, 102.

The first blade 101 protrude at the center of the body 41, and the second blade 102 protrudes at a top end of the body 41 to be spaced apart from the first blade 101.

As shown in FIG. 8, one surface of the first coil winding unit 31 is provided at one surface of the first blade 101, and one surface of the second coil winding unit 32 is provided at the other surface of the first blade 101. The lower surface of the second blade 102 is provided to face the other surface of the first coil winding unit 31.

The first coil winding unit 31 is provided between the first and second blades 101, 102, and the second coil winding unit 32 is provided at the lower surface of the first blade 102 so that the first and second coil winding units 31, 32 face each other.

In this state, if a current is applied to the first and second coil winding units 31, 32, a magnetic field may be induced around the first and second coil winding units 31, 32. At this time, an electromagnetic force is generated through the first and second coil winding units 31, 32, the magnet 71 forms a magnetic flux is formed to pass the first and second coil winding units 31, 32 in a lateral direction, and the magnetic field generated by the first and second coil winding units 31, 32 is formed in a vertical direction so that the vibrator 70 vibrates up and down. The direction of the magnetic flux of the magnet 71 is perpendicular to the vibrating direction of the vibrator 70. Thus, the vibrator 70 generates vibration in an up and down direction.

Figure 9:
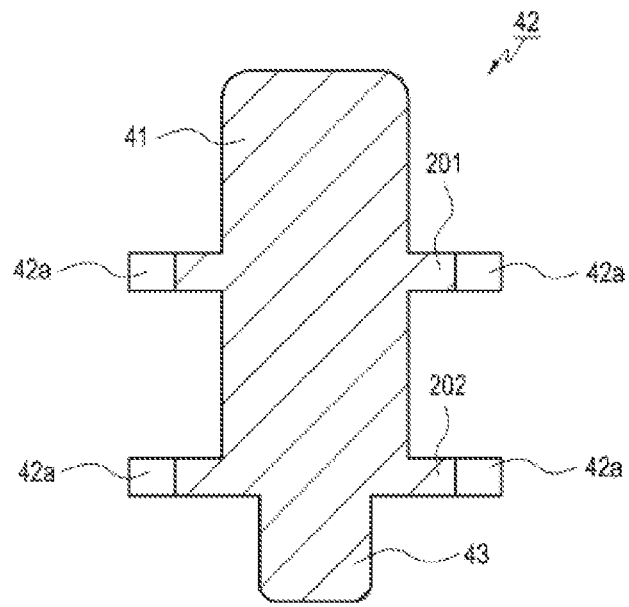
FIG. 9 is a longitudinal sectional view showing a center yoke of the linear vibration generating device according to still another embodiment of the present disclosure.
Figure 10:
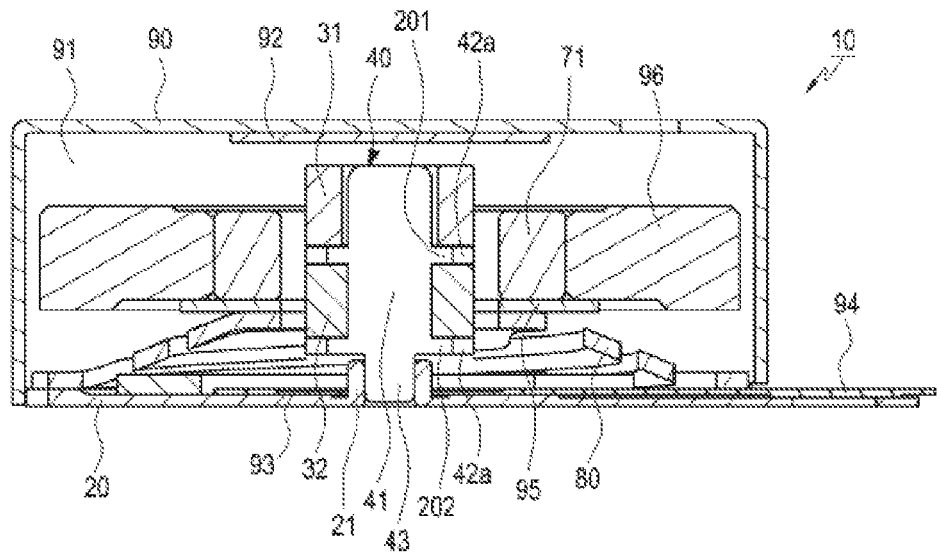
FIG. 10 is a longitudinal sectional view showing the linear vibration generating device according to various embodiments of the present disclosure in an assembled state, to which the center yoke of FIG. 9 is applied.

In addition, FIG. 9 is a longitudinal sectional view showing a blade 42 according to another embodiment of the present disclosure, and FIG. 10 is a longitudinal sectional view showing that the blade 42 of FIG. 9 is in use.

First, as shown in FIG. 9, the blade 42 is composed of first and second blades 201, 202.

The first blade 201 protrude at the center of the body 41, and the second blade 202 protrudes at a bottom end of the body 41 to be spaced apart from the first blade 101.

As shown in FIG. 10, one surface of the first coil winding unit 31 is provided at one surface of the first blade 201, and one surface of the second coil winding unit 32 is provided at the other surface of the first blade 201. The other surface of the second coil winding unit 32 is provided to face the upper surface of the second blade 202.

The second coil winding unit 32 is provided between the first and second blades 201, 202, and the second coil winding unit 32 is provided at the upper surface of the second blade 202 so that the first and second coil winding units 31, 32 face each other.

In this state, the operations of the first and second coil winding units 31, 32 and the magnet 71 are identical to those of the first and second coil winding units 31, 32 and the magnet 71 depicted in FIGS. 7 and 8 and explained above, and thus they are not described in detail here.

Figure 11:
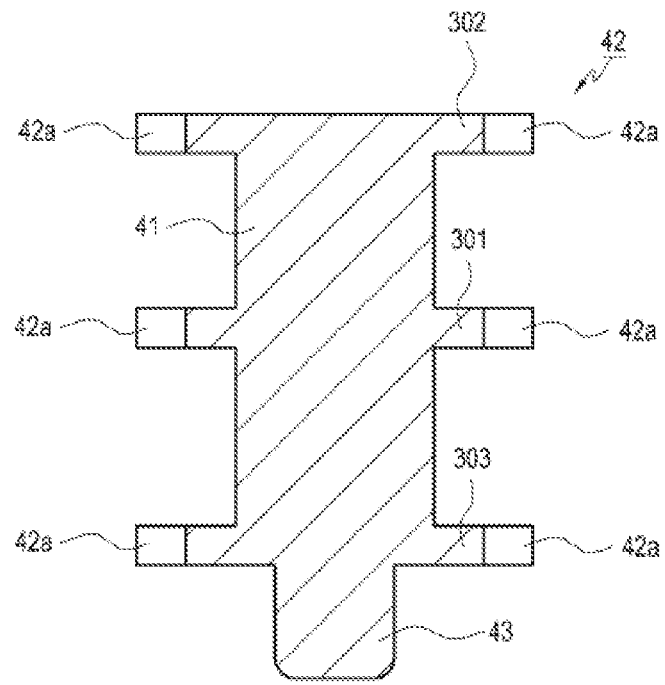
FIG. 11 is a longitudinal sectional view showing a center yoke of the linear vibration generating device according to further another embodiment of the present disclosure.
Figure 12:
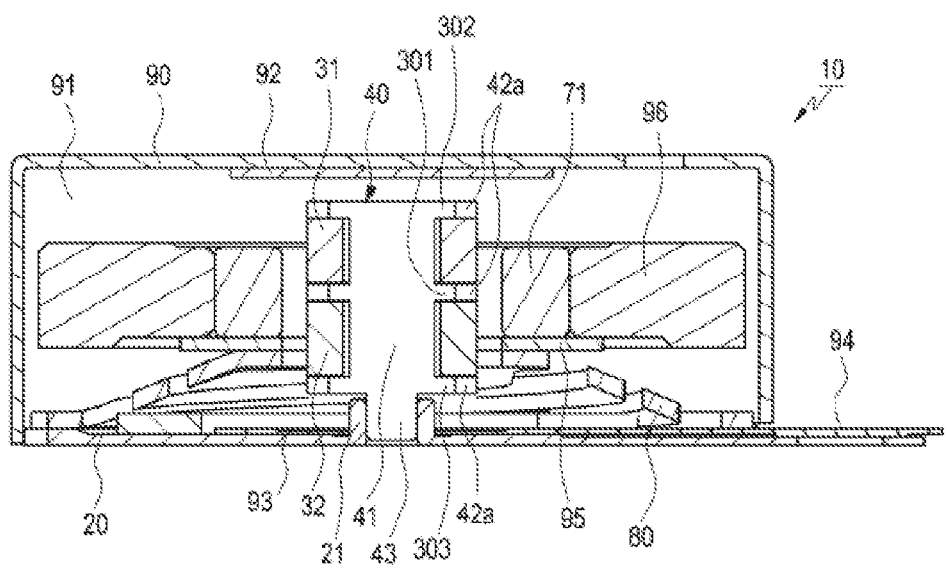
FIG. 12 is a longitudinal sectional view showing the linear vibration generating device according to various embodiments of the present disclosure in an assembled state, to which the center yoke of FIG. 11 is applied.

In addition, FIG. 11 is a longitudinal sectional view showing a center yoke 42 of the linear vibration generating device according to further another embodiment of the present disclosure, and FIG. 12 is a longitudinal sectional view showing the center yoke 42 depicted in FIG. 11 in use.

First, as shown in FIG. 11, the blade 42 is composed of a first blade 301, a second blade 302 and a third blade 303. Here, the first blade 301 protrude at the center of the body 41, the second blade 302 protrudes at the top end of the body 41 to be spaced apart from the first blade 301, and the third blade 303 protrudes at the bottom end of the body 41 to be spaced apart from the first blade 301.

As shown in FIG. 12, one surface of the first coil winding unit 31 is provided at one surface of the first blade 301, and one surface of the second coil winding unit 32 is provided at the other surface of the first blade 301. The other surface of the first coil winding unit 31 is provided to face the lower surface of the second blade 302, and the other surface of the second coil winding unit 32 is provided to face the upper surface of the third blade 303.

The first coil winding unit 31 is provided between the first and second blades 301, 302, and the second coil winding unit 32 is provided between the first and third blades 301, 303. In other words, the first and second coil winding units 31, 32 are provided between the first blade 301 and the second blade 302 and between the second blade 302 and the third blade 303 to face each other.

In this state, the operations of the first and second coil winding units 31, 32 and the magnet 71 are identical to those of the first and second coil winding units 31, 32 and the magnet 71 depicted in FIGS. 7 and 8 and explained above, and thus they are not described in detail here.

Here, referring to FIG. 1 an assembling process of the linear vibration generating device 10 will be described in more detail. As shown in FIG. 1, first, the linear vibration generating device 10 includes a stator 50 having a bracket 20, first and second coil winding units 31, 32 and a center yoke 40, a vibrator 70 having a magnet 71, an elastic body 80, upper and lower anti-collision members 92, 93, a weight 96, a lower plate 95 and a substrate 94.

In this state, the lower anti-collision member 93 and the substrate 94 are provided at an upper portion of the bracket 20, the elastic body 80 is provided at the upper portion of the bracket 20, and the lower plate 95 and the weight 96 are provided at an upper portion of the elastic body 80. At this time, the center yoke 40 is coupled to the center of the elastic body 80. The first and second coil winding units 31, 32 are disposed to face upper and lower portions of the blade 42 which protrudes out of the body 41 of the center yoke 40. In other words, the first coil winding unit 31 is provided at the upper surface of the blade 42, and simultaneously the first coil winding unit 31 is inserted into the body 41. The second coil winding unit 32 is provided at the lower surface of the blade 42, and simultaneously the second coil winding unit 32 is inserted into the body 41.

The magnet 71 is disposed to surround the outer circumference of the first and second coil winding units 31, 32 and is provided at the center of the weight 96. The upper anti-collision member 92 for preventing a collision of the center yoke 40 is provided at the ceiling of the case 90.

In this state, the case 90 is coupled to the upper portion of the bracket 20. An inner space 91 is formed in the case 90, and the inner space 91 accommodates and protects the upper and lower anti-collision members 92, 93, the elastic body 80, the center yoke 40, the weight 96, the magnet 71 and the first and second coil winding units 31, 32.

In addition, the blades 42 are formed larger than the outer diameter of the first and second coil winding units 31, 32 to protect the first and second coil winding units 31, 32.

Moreover, since at least one passage 42a is formed in the blades 42 so that a coil wires (not shown) of the first and second coil winding units 31, 32 may pass therethrough, when the first and second coil winding units 31, 32 are disposed to face the upper and lower portions of the blade 42, the coil wires (not shown) of the first and second coil winding units 31, 32 may pass through the passage 42a to electrically connect the first and second coil winding units 31, 32. Thus, it is easy to apply a current to the first and second coil winding units 31, 32.

In addition, a fixing protrusion 43 is formed at a lower portion of the center yoke 40 so as to be coupled and fixed to a fixing portion 21 formed at the center of the bracket 20.

Figure 5:
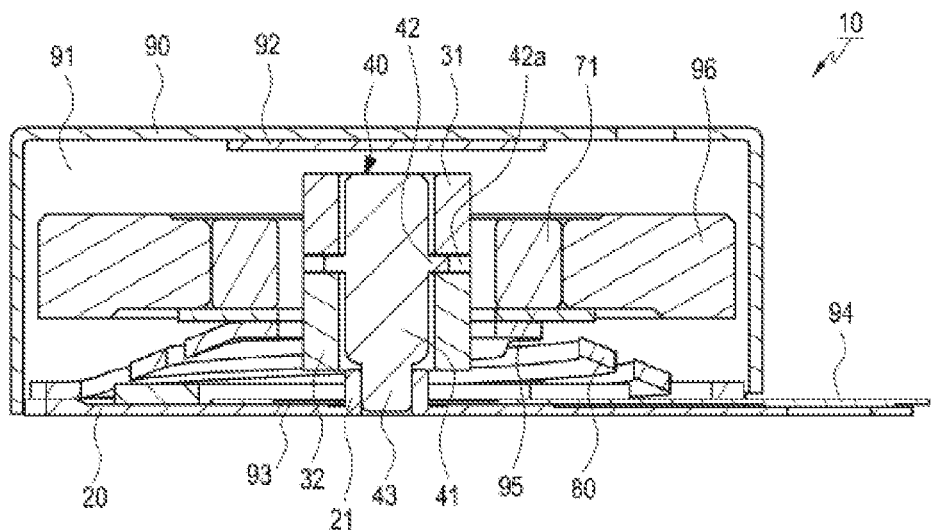
FIG. 5 is a longitudinal sectional view showing the linear vibration generating device according to various embodiments of the present disclosure in an assembled state.

In other words, as shown in FIG. 5, the fixing protrusion 43 of the center yoke 40 is inserted or fitted into the fixing portion 21 formed at the center of the bracket 20. The fixing portion 21 has a hollow. The fixing portion 21 protrudes upward on the bracket 20 by a predetermined height. Moreover, the fixing portion 21 has a protruding height enough to fix the center yoke 40 by inserting/fitting the fixing protrusion 43 of the center yoke 40.

Meanwhile, the operation of the linear vibration generating device 10 in an assembled state will be described. First, FIG. 5 is a longitudinal sectional view showing the linear vibration generating device 10 according to various embodiments of the present disclosure in an assembled state.

As shown in FIG. 5, if a current is applied to the first and second coil winding units 31, 32 disposed at the upper and lower portions of the blade 42, a magnetic field may be induced around the first and second coil winding units 31, 32. At this time, if an electromagnetic force is generated by means of the first and second coil winding units 31, 32, a magnetic flux passing through the first and second coil winding units 31, 32 from the magnet 71 is formed in a lateral direction, and a magnetic flux generated by the first and second coil winding units 31, 32 is formed in a vertical direction, thereby vibrating the vibrator 70 up and down. Here, the direction of the magnetic flux of the magnet 71 is perpendicular to the vibrating direction of the vibrator 70.

In other words, if an electromagnetic force having the same frequency as the natural frequency of the vibrator 70 is provided, the vibrator 70 may vibrate to have the maximum vibration amount, and the natural frequency of the vibrator 70 is influenced by the mass of the vibrator 70 and the elasticity of the elastic body 80.

In other words, the elastic body 80 gives elasticity and supporting force so that the vibrator 70 may vibrate.

The substrate 94 is electrically coupled to the coil wires (not shown) of the first and second coil winding units 31, 32, which configure an electromagnet 71, to apply a current. The coil wires (not shown) pass through the passage 42a formed in the blade 42 and are electrically connected to the first and second coil winding units 31, 32.

As described above, the first and second coil winding units 31, 32 are disposed at the upper and lower portions of the blade 42 extending in an outer direction of the center yoke 40 to face the upper and lower portions of the blade 42, and simultaneously the coil wire (not shown) of the first and second coil winding units 31, 32 passes through the passage 42a of the blade 42 to electrically connect the first and second coil winding units 31, 32 so that a current may be easily applied to the first and second coil winding units 31, 32. By doing so, a magnetic field may be induced more easily by the coil winding unit 30, and the vibrator 70 may generate vibrations as much as possible by the electromagnetic force of the first and second coil winding units 31, 32 and the magnet 71.

What is claimed is:

1. A linear vibration generating device, comprising:
a stator fixed on a bracket and having a center yoke concentrically fixed in an inner space of coil winding units and at least one blade extending from the center yoke in a direction perpendicular to the concentric axis;
a vibrator having a magnet surrounding outer circumferences of the coil winding units; and
an elastic body disposed between the bracket and the vibrator to support a vibration of the vibrator,
wherein the blade has at least one passage through which a coil wire for electrically connecting the coil winding units passes, and
wherein the passage is formed with a passing groove.

2. The linear vibration generating device according to claim 1, wherein the blade is formed integrally with the center yoke, and the passage is formed to extend from a body of the center yoke or to be spaced apart from the body.

3. The linear vibration generating device according to claim 1, wherein the coil winding units are composed of first and second coil winding units, and wherein the first and second coil winding units are wound in opposite directions.

4. The linear vibration generating device according to claim 3, wherein the first and second coil winding units have winding numbers or heights symmetric to each other.

5. The linear vibration generating device according to claim 3, wherein the first and second coil winding units have winding numbers or heights asymmetric from each other.

6. The linear vibration generating device according to claim 1, wherein the blade includes first and second blades.

7. The linear vibration generating device according to claim 6, wherein the blade further includes a third blade.

8. The linear vibration generating device according to claim 2, wherein the blade is provided at a center of the body.

9. The linear vibration generating device according to claim 7, wherein the blade has a size equal to or smaller than an outer diameter of the coil winding units or greater than the outer diameter.

10. The linear vibration generating device according to claim 1, wherein a case is further provided above the bracket to form an internal mounting space.

11. The linear vibration generating device according to claim 1, wherein the elastic body is disposed between the case and the vibrator.

* * * * *